Jan. 27, 1931.  L. WITTBOLD  1,789,994
CONTAINER
Filed June 17, 1929

Inventor:
Louis Wittbold
by Munn & Munn
Attys

Patented Jan. 27, 1931

1,789,994

UNITED STATES PATENT OFFICE

LOUIS WITTBOLD, OF EVANSTON, ILLINOIS

CONTAINER

Application filed June 17, 1929. Serial No. 371,551.

This invention relates to a container for prepared soil to which a small plant may be transplanted. It is concerned more particularly with the provision of a closure for the container which may serve also as a saucer in which the container bottom is rested, with the provision of a fragile closure for a small hole in the container bottom adapted to disintegrate or be broken when the container is put to use, and generally with certain features which adapt the container to fulfill the peculiar requirements of the use for which it is intended.

There is at the present time a large sale for small plants, the roots of which are temporarily protected only by a small bag containing practically no earth. The purchaser is expected promptly to locate a suitable pot, to fill this pot with suitable earth, and to transplant the plant into the pot as soon as may be. The success of a plant so transplanted depends in large measure upon close attention to these several details. It is more than likely that the earth which is placed in the pot which receives the plant is not entirely suitable for the purpose, in consequence of which the plant will fail to thrive as it should.

According to this invention a container for specially prepared soil is constructed in such a way as to serve ultimately in the capacity of a pot into which a small plant may be transplanted with safety. Such a container has a small drainage opening in its bottom, and its enlarged upper end is entirely open when placed in use. Previous to the container being required to function as a pot, a fragile closure is applied over the hole in its bottom, and a second closure of durable character is applied to the larger top opening. It is intended that the container so sealed shall contain a specially prepared soil, and be sold over the same counter with plants that are to be transplanted thereinto. The purchaser will accordingly be enabled in one transaction to acquire a plant, and also a container to serve as a pot therefor, and perhaps to select from a variety of designs of such containers as well, and by rendering possible a speedy transplanting of the plant to a soil which is particularly suited therefor the growth and health of the plant is assured.

Figure 1:
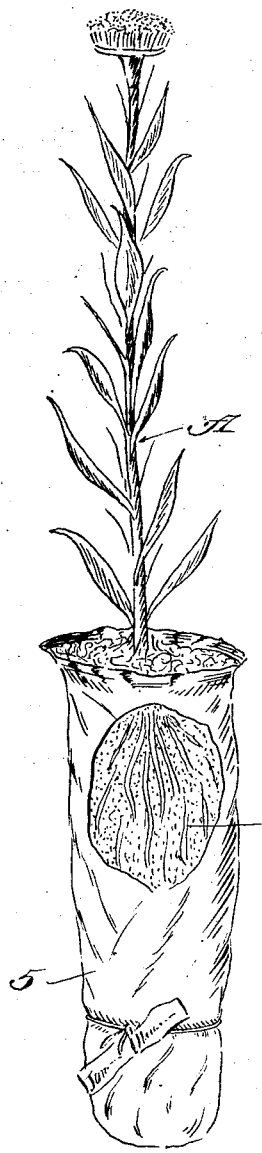
Figure 2:
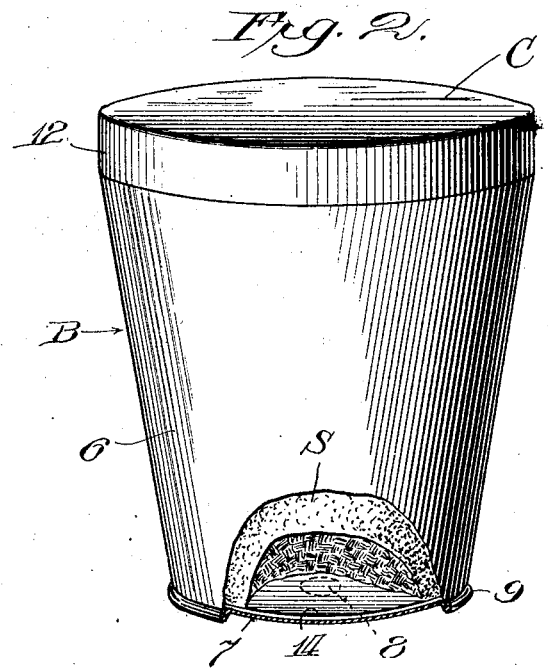
Figure 3:
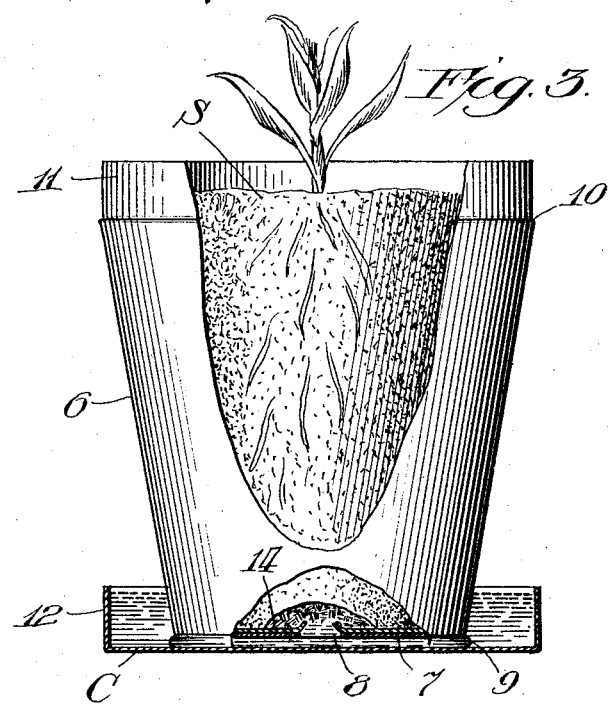

An exemplification of this invention is set forth in the accompanying drawing wherein:

Figure 1 is a perspective view of a small plant, the roots of which are enclosed in a bag, a portion of which is broken away to show the interior thereof;

Fig. 2 is a perspective view of the container with a portion of its wall broken away to exhibit the soil therewithin as well as the closure for its bottom hole; and Fig. 3 is a side view of the container with its bottom rested in a saucer (shown in section) which previously functioned as the closure for the upper end of the container, portions of the container wall being broken away to illustrate a plant which is transplanted therewithin, and the fractured seal at the container bottom.

In Fig. 1 I have shown a plant A having its roots 4 surrounded and protected by a bag 5. Such is the condition of many small plants when sold to a purchaser who must thereafter transplant the same into a pot at the first opportunity.

The container B, which is shown in Figs. 2 and 3, may be made of sheet metal suitably decorated or ornamented upon its exterior. This container is in the form of a pot with slanting walls 6 upstanding from a flat bottom 7 having a central drainage hole 8 as is usual. The bottom may be interlocked in place within a bead 9 which, by preference, extends therebelow so as to support the bottom at an elevated point when the pot is rested on a plane surface.

The container walls near their upper end are inset at 10 to provide a shoulder above which the walls extend vertically at 11 to cooperate with the flange 12 of a closure C which is in the general form of a saucer. When the closure is applied in place, as shown in Fig. 2, the container is sealed except for the opening 8 in its bottom, and this may be closed by a disk 14 of paper or other fragile material which is rested against the container bottom. With both ends sealed, as explained, soil S received within the container will be protected against loss and deterioration up to the time that the closure C is removed preliminary to a transplanting operation.

Having assembled a small plant and a container of the kind described, the closure C is taken off and inverted to serve as a saucer in which the pot bottom may be rested. The bag is stripped from the roots of the plant, a proper opening is made in the soil within the container, and the plant roots are thereupon transplanted therewithin. Water is to be added to the soil from time to time in the usual way for the nourishment of the plant. The fragile seal at the container bottom may be broken mechanically, or the moisture in the soil resulting from addition of water may be depended upon to cause the seal to disintegrate, thereby establishing communication between the container interior and the saucer in which it is resting. The bead 9 which depends below the container bottom causes the latter to be maintained at an elevated point in relation to the bottom of the saucer so that water within the saucer can seep beneath the pot and be drawn into the interior of the container to moisten the soil therewithin.

I claim:

1. A soil container convertible into a pot for plants comprising a receptacle having an enlarged open upper end and a closed bottom with a drain hole therein, a flanged closure applied to the upper end of the receptacle and adapted upon removal and inversion to provide a saucer within which the receptacle bottom may be received so that the entire bottom may be surrounded by water when placed in the saucer, fragile closure means within the receptacle adjacent its bottom adapted to seal the hole therethrough, said latter closure when punctured affording a drain passage through the receptacle into the saucer therebelow, and means depending below the receptacle bottom adjacent the edges thereof affording an elevated support for the bottom when the receptacle is rested within the saucer.

2. A soil container convertible into a pot for plants comprising a receptacle having an enlarged open upper end and a closed bottom with a drain hole therethrough, there being means extending around the bottom and depending therebelow adapted to provide support for the bottom at an elevated point, a flanged closure applied to the upper end of the receptacle and adapted upon removal and inversion to provide a saucer within which the receptacle bottom may be received and supported above the saucer bottom so that the receptacle bottom will be totally covered by water when placed in the saucer, and disintegrable closure means for the hole within the receptacle bottom adapted in the presence of moisture to open a drain passage therethrough to said saucer.

3. A soil container convertible into a pot for plants comprising a receptacle having an enlarged open upper end and a closed bottom with a drain hole therein, a flanged closure fitted over the upper end of the receptacle and adapted upon removal and inversion to provide a saucer in which the receptacle bottom may be received so that the entire bottom may be surrounded by water when placed in the saucer, and fragile closure means within the receptacle adjacent its bottom adapted to seal the hole therethrough, said latter closure when ruptured affording a drain passage through the receptacle into the saucer therebelow.

In testimony whereof, I have hereunto set my hand this 14th day of June, 1929.

LOUIS WITTBOLD.